United States Patent
Schmidt

(10) Patent No.: US 7,125,246 B2
(45) Date of Patent: Oct. 24, 2006

(54) HOT RUNNER FOR MOLDING SMALL PLASTIC ARTICLES

(75) Inventor: Harald Hans Schmidt, Georgetown (CA)

(73) Assignee: Mold Hotrunner Solutions Inc., Georgetown (CA)

( * ) Notice: Subject to any disclaimer, the term of this patent is extended or adjusted under 35 U.S.C. 154(b) by 270 days.

(21) Appl. No.: 10/681,065

(22) Filed: Oct. 8, 2003

(65) Prior Publication Data

US 2005/0079242 A1   Apr. 14, 2005

(51) Int. Cl.
*B29C 45/23* (2006.01)
(52) U.S. Cl. ........................... 425/563; 425/572
(58) Field of Classification Search ........ 425/557–561, 425/562–566, 572
See application file for complete search history.

(56) References Cited

U.S. PATENT DOCUMENTS

| | | | |
|---|---|---|---|
| 2,478,013 A | 8/1949 | Roddy | |
| 2,890,491 A | 6/1959 | Hendry | |
| 3,417,433 A * | 12/1968 | Teraoka | 425/559 |
| 4,330,258 A * | 5/1982 | Gellert | 425/564 |
| 4,717,324 A | 1/1988 | Schad et al. | |
| 4,863,369 A | 9/1989 | Schad et al. | |
| 4,909,724 A | 3/1990 | Sonoda et al. | |
| 5,135,701 A | 8/1992 | Farrell | |
| 5,223,275 A * | 6/1993 | Gellert | 425/564 |
| 5,246,660 A * | 9/1993 | Tsutsumi | 425/562 |
| 5,260,012 A | 11/1993 | Arnott | |
| 5,389,331 A | 2/1995 | Uehara et al. | |
| 5,424,020 A | 6/1995 | Hara et al. | |
| 5,792,493 A | 8/1998 | Gellert et al. | |
| 6,235,229 B1 | 5/2001 | Beck et al. | |
| 6,403,010 B1 | 6/2002 | Ganz et al. | |
| 6,403,610 B1 | 6/2002 | Malleron et al. | |
| 6,464,909 B1 | 10/2002 | Van Geel Huip et al. | |
| 2002/0182285 A1 | 12/2002 | Godwin et al. | |

FOREIGN PATENT DOCUMENTS

| | | |
|---|---|---|
| EP | A-0 955 146 | 11/1999 |
| FR | 1339308 | 10/1963 |
| JP | 01182017 | 7/1989 |
| JP | 06055584 | 3/1994 |
| JP | 07040400 | 2/1995 |

(Continued)

OTHER PUBLICATIONS

"Medical Hotrunners" Brochure by Mold Hotrunner Solutions, Jul. 2002.

(Continued)

*Primary Examiner*—Tim Heitbrink
(74) *Attorney, Agent, or Firm*—Edwards Angell Palmer & Dodge LLP

(57) ABSTRACT

A hot runner system for injecting plastics material from a plasticizer unit into an injection mold for molding very small plastic devices, includes a hot runner manifold having an inlet for receiving melted plastics material from the plasticizer unit and a heater for maintaining the manifold at an elevated temperature. A check valve mounted in the manifold allows one way flow of the plastic in the feed conduit. This valve preferably comprises a ball type valve. A metering apparatus includes a cylinder forming an elongate metering chamber and a ram movable therein. An inner end of the chamber opens into one side of the feed conduit downstream of the check valve and the longitudinal axis of the chamber is perpendicular to the longitudinal axis of the conduit where they meet. At least one injector is connected to a downstream end of the feed conduit and it is spaced from the metering apparatus.

30 Claims, 6 Drawing Sheets

FOREIGN PATENT DOCUMENTS

| | | |
|---|---|---|
| JP | 2000141439 | 5/2000 |
| WO | WO97/07960 | 3/1997 |

OTHER PUBLICATIONS

"Packaging Hotrunners" Brochure by Mold Hotrunners Solutions, Jul. 2002.

"Automotive Hotrunners" Brochure by Mold Hotrunner Solutions, Jul. 2002.

"The Troubleshooter—Part 58—Sizing Runners" published in Injection Molding Magazine in Feb. 2003, pp. 44, 46.

Mini Hot Runner Systems Explore New Applications published in Injection Molding in Oct. 2002, pp. 62, 64.

"Micromolding Sizing Up The Challenges" published in Plastics Technology in Apr. 2001, by Mikell Knights, pp. 1 to 6 of Online Article.

"A New Machine Segregates Injection and Extrusion" published in injection Molding, in May 2003, pp. 96, 98.

Lang, A., "Heisskanal Technik Heute Systeme, Entwicklungen, Trends", Kunststoffe, Hanser, vol. 90, No. 11, Nov. 2000, pp. 80, 82, 84, 86, 88-89.

Ohnuma, S.: "64Fach-Heisskanal Werkzeug Fuer Dichtmanschetten AUS TPE", Kunststoffe, Hanser, Munchen, DE, vol. 79, No. 11, Nov. 1, 1989, pp. 1123-1124.

"Harmonie AUF Engstem Raum", Plastverabeiter, Zechner und Huethig Verlag GmbH, vol. 49, No. 3, Mar. 1998, pp. 96-97.

"Kleinste Duese", Plastverarbeiter, Zechner und Huethig Verlag GmbH, vol. 46, No. 10, Oct. 1, 1995, p. 212.

Hagelstein H et al., "AUF DIE Spitze Getrieben", Plastverarbeiter, Zechner und Huethig Verlag GmbH, vol. 50, No. 5,May 2000, p. 118-122.

Solan, Jeff, "A New Machine Segregates Injection and Extrusion", Injection Molding, May 2003, pp. 96,98.

European Search Report (from related pending application EP 1 522 396 A3).

* cited by examiner

HOT RUNNER FOR MOLDING SMALL PLASTIC ARTICLES

BACKGROUND OF THE INVENTION

This invention relates to hot runner systems for injecting plastics materials from a plasticizer unit into an injection mold and, in particular, to hot runner systems suitable for molding very small plastic parts and devices.

Although a number of attempts have been made by various companies to develop systems for efficiently and economically producing small plastic parts such as those that might be used in medical syringes, laboratory ware and surgical equipment, there remains a need to develop improved systems to make micro plastic parts which are not unduly expensive and which are adaptable for the molding of a variety of parts and components. One known system for making small parts is that made by Mold Hotrunner Solutions Inc. of Georgetown, Ontario, Canada, and this uses a multi-nozzle for injecting the plastic material into the mold using several gates arranged on a circle. This arrangement is able to produce a plastic part that consists of a concentric ring. With this system larger parts can be made using individual nozzles because the flow residence time is less critical.

A recently developed German system involves encapsulating an electronic subassembly for a sensor with a protective housing using injection molding. In this recently developed system a prefabricated subassembly is passed through an injection molding machine while still on a metal strip and this is encapsulated using a so-called "outsert technique". Unlike the conventional hotrunner system, this new system has a local plunger injection system positioned at the back end of each needle valve. This consists of a tubular plunger which acts on a hollow cylinder or antechamber between a 2 millimeter thick needle and a 3.5 millimeter diameter runner. As a result the feeding of the plastic melt with the aid of the plasticizing unit is entirely separate from the injection into each of the cavities. This process is also known as transfer injection molding. This known system is taught in recent German patent No. 196 32 315.

In the first step of this injection molding process or cycle, the needles of the needle valve nozzles keep the gate closed. The injection stroke of the screw forces the plastic melt out of the screw antechamber via the gate bushing, the two valves and the runners into the antechambers around the valve needles. As a result the right amount of melt for the injection is ready in each plunger injection unit. In the next step, a mounting plate moves in the direction of the runner whereby the valves close the connection to the plasticizing unit. Thus the plastic melt is enclosed in the runner system and can no longer flow back to the machine nozzle. Through the movement of a plate and a spring assembly behind the tubular plunger, a melt pressure of 600 to 800 bar is built up. Then another plate assembly travels with the needle valves to open the valve gate to the component. At the same time the first mentioned movable plate continues its movement so that the tubular plunger can inject the melt located in the hollow cylinder into the cavity, the injection pressure being around 2500 bar. After the required holding pressure time and cooling time have elapsed, both of the plate assemblies return to the original position and the needle valves close off the gate. The valves clear the way for the melt that has been plasticized so that a new cycle can begin.

U.S. Pat. No. 6,403,010 issued Jun. 11, 2002, also describes an apparatus for molding micro parts out of plastic. This apparatus includes a plasticizing apparatus, a dosing or metering apparatus connected by a passage to the plasticizing apparatus, and an injection apparatus connected to the dosing apparatus by a further passageway. Backflow of the melt from the metering apparatus is prevented by a non-return valve.

U.S. Pat. No. 4,863,369 issued Sep. 5, 1989 to Husky Injection Molding Systems Ltd. describes a hot runner system for delivering melted plastics material from a plasticizer unit to a multi-cavity mold. This system includes a metering device in the form of a piston mounted in a cylindrical chamber which is individual to each mold cavity and which is designed to feed a desired quantity of the thermal plastic material to each cavity. However, this hot runner system, because of its particular arrangement and conduit system, is not believed to be suitable for molding very small plastic parts and devices. Also, in this known system, after the reservoir in each metering device has been fully charged with the plastics compound, a valve is closed upstream of the metering device. Only after the valve is closed is a nozzle stem of an injector opened and the piston advanced in order to force the plastics compound through a conduit and an injector passage into the mold cavity.

There are a number of known problems that must be taken into account in the design of hot runner systems. One serious potential problem is thermal degradation of the melted plastics material caused by excessive residence time in the delivery channel or conduit. Such degradation can cause changes in the molded parts physical properties or lead to burning. Also, mold designs for small parts and devices include tight cavity spacing and large pockets cut into the mold base relative to its size. These molds require cooling and cavity spacing for small parts can limit water line access to the cavities in the gate area. Consideration for the proximity and size of water lines is critical for molding the parts. Furthermore, small part molding relies on heat input from manifold heaters for melt uniformity and thus heater layout and thermal conductivity must be considered in manifold design to obtain minimal temperature variation across the manifold.

A further challenge for the micromolding industry is that the molding presses and the injecting system for micro parts generate higher injection speeds and pressures to push the melt through tiny nozzles and flow channels. For example, normal plastic molding can use an injection pressure of about 20,000 psi while some known micromolding applications need up to 40,000 psi. Higher injection speed helps reduce viscosity through shear thinning and ensures that the material will fill the part before it cools.

Adding to the challenges of micromolding, high performance miniature parts often require engineered materials like polyamide-imide, liquid crystal polymer, PEEK, and PPS, in addition to more standard ABS, nylon, and acetal.

Generally speaking, a micromolding system demands a small extrusion screw for the plasticizing unit, this screw being proportioned to the shot size. Generally, a 14 mm screw is the smallest root diameter used for micromolding purposes. It should also be noted here that runner systems for micromolding in the past have tended to be cold-runner types but the substantial disadvantage of such systems is that there can be a significant amount of material wastage.

According it is an object of one aspect of the present invention to provide an improved hot runner system for injecting plastics material from a plasticizer unit into an injection mold, this system being reliable and relatively easy to maintain and use as well as being adaptable for the molding of very small plastic parts and devices.

An object of another aspect of this invention is to provide a hot runner system for injecting melted plastics material into at least one small mold cavity which employs a relatively simple, reliable check valve, including a valve chamber and a ball movable within this chamber between a valve closing position and a valve open position, this valve preventing the melted plastics material from backflowing to the plasticizing unit during operation of a metering apparatus located downstream of the check valve.

An object of a further aspect of the invention is to provide a unique hot runner system for injecting melted plastics material into at least one mold cavity, this system employing a two-part manifold apparatus wherein first and second manifold sections are spaced apart by an insulating arrangement, each section having its own heater so that the first section can operate at a lower elevated temperature range than the second manifold section.

SUMMARY OF THE INVENTION

According to one aspect of the invention, a hot runner system for injecting plastics material from a plasticizer unit into an injection mold for molding very small plastic devices and parts includes a hot runner manifold having an inlet for receiving melted plastics material from the plasticizer unit and at least one heating arrangement for maintaining the manifold at a selected elevated temperature suitable for flow of the melted plastics material through the manifold without undesirable degradation. An elongate plastics feed conduit is connected to the inlet and a check valve is mounted in the manifold and allows one way flow of the plastics material in the feed conduit in a direction of flow away from the inlet. At least one injection apparatus is operatively connected to a downstream end of the feed conduit and the or each injection apparatus has a central longitudinal injection axis. A metering apparatus adapted to provide a precise quantity of the melted plastics material to the at least one injection apparatus is provided. This metering apparatus includes a cylinder unit forming an elongate metering chamber and a ram movable in this chamber. The chamber has a longitudinal axis and an inner end which is open at one side of an elongate portion of the feed conduit and which is downstream of the check valve. The longitudinal axis of the metering chamber is substantially perpendicular to the central longitudinal axis of the elongate portion of the conduit. A controller is provided to control movement of the ram in the metering chamber. The at least one injection apparatus is spaced a substantial distance from the metering apparatus, including the inner end of the metering chamber. The metering apparatus is able to provide a selected quality of the melted plastics material to the at least one injection apparatus via a downstream section of the feed conduit while the check valve prevents melted plastics material in the feed conduit from backflowing to the plasticizing unit. The at least one injection apparatus is adapted to inject the selected quantity of the melted plastics material into at least one molding cavity of the injection mold during use of the system. The central longitudinal injection axis of the at least one injection apparatus is at a substantial angle to the longitudinal axis of the elongate chamber and, in the preferred embodiment is perpendicular to the longitudinal axis of the elongate chamber.

Preferably, the check valve includes a valve chamber and a ball movable within the chamber between a valve closing position at an upstream side of the valve chamber and a valve open position at a downstream side of the chamber.

According to another aspect of the invention, a hot runner system for injecting melted plastics material from a plasticizer unit into at least one small mold cavity includes a hot runner manifold having an inlet for receiving the melted plastics material from the plasticizer unit, a heating arrangement for maintaining the manifold in one or more desired temperature ranges suitable for conducting the melted plastics material through the manifold and at least one elongate plastics feed conduit formed in the manifold and connected to the inlet. There is also a check valve mounted in the manifold and constructed to allow only one way flow of the plastics material in the at least one feed conduit in a direction of flow away from the inlet. The check valve includes a valve chamber and a ball movable within the chamber by the melted plastics material between a valve closing position at an upstream side of the chamber and a valve open position at a downstream side of the chamber. At least one plastics injection apparatus is operatively connected to an outlet end of the at least one feed conduit and is adapted to inject a selected quantity of the melted plastics material into the at least one small mold cavity. There is also provided a metering apparatus capable of providing a selected small quantity of the melted plastics material to the at least one injection apparatus while the at least one injection apparatus is carrying out its plastic injection operation. The metering apparatus includes an elongate metering chamber and a ram movable in the metering chamber. The metering chamber has an open inner end located on one side of one of the at least one feed conduit downstream of the check valve and upstream of the outlet end of the at least one feed conduit. The metering apparatus is able to provide the selected small quantity of the melted plastics material to the at least one injection apparatus via a downstream section of the at least one feed conduit while the check valve prevents the melted plastics material from backflowing to the plasticizing unit.

In a preferred embodiment, the check valve includes a valve body, which is a valve member separate from the manifold and in which the valve chamber is at least partially formed. Grooves are formed in the valve body at the downstream side of the chamber and these grooves permit flow of the melted plastics material around and past the ball during use of the hot runner system.

According to a further aspect of the invention, a hot runner system for injecting melted plastics material from a plasticizer unit into at least one mold cavity includes a two-part manifold apparatus including first and second manifold sections which are located close to each other but are spaced apart a short distance by an insulating arrangement. The first manifold section includes an inlet for receiving melted plastics material from the plasticizer unit and a first conduit system formed in the section for conducting the plastics material to the second manifold section. The first conduit system is connected to the inlet. A second feed conduit system is formed in the second manifold section for conducting the melted plastics material and this system is operatively connected to the first feed conduit system. There are at least one primary heater for heating the first manifold section to a first elevated temperature range suitable for conducting the melted plastics material without significant thermal degradation and at least one secondary heater for heating the second manifold section to a second temperature range which is hotter than the first temperature range and which heats the melted plastics material to the second temperature range which is suitable for injecting the melted plastics material into the at least one mold cavity. There are also provided at least one injection apparatus for respectively injecting a desired quantity of the melted plastics material into the at least one mold cavity and at least one check valve mounted in the manifold apparatus to provide one way flow of the melted plastics material in a direction away from the inlet. The at least one injection apparatus is operatively connected to the second feed conduit system. A metering apparatus provides a desired quantity of the molded plastics material to each of the at least one mold cavity and this apparatus is provided in the second manifold section so as to deliver the desired quantity of the melted plastics material to the second conduit system at at least one location downstream from the at least one check valve. Preferably the insulating arrangement is an air gap formed between the first and second manifold sections and each of the at least one primary heater and the at least one secondary heater is a tubular electrical heater mounted to or in its respective manifold section.

Further features and advantages will become apparent from the following detailed description taken in conjunction with the accompanying drawings.

DETAILED DESCRIPTION OF PREFERRED EMBODIMENTS

Figure 1:
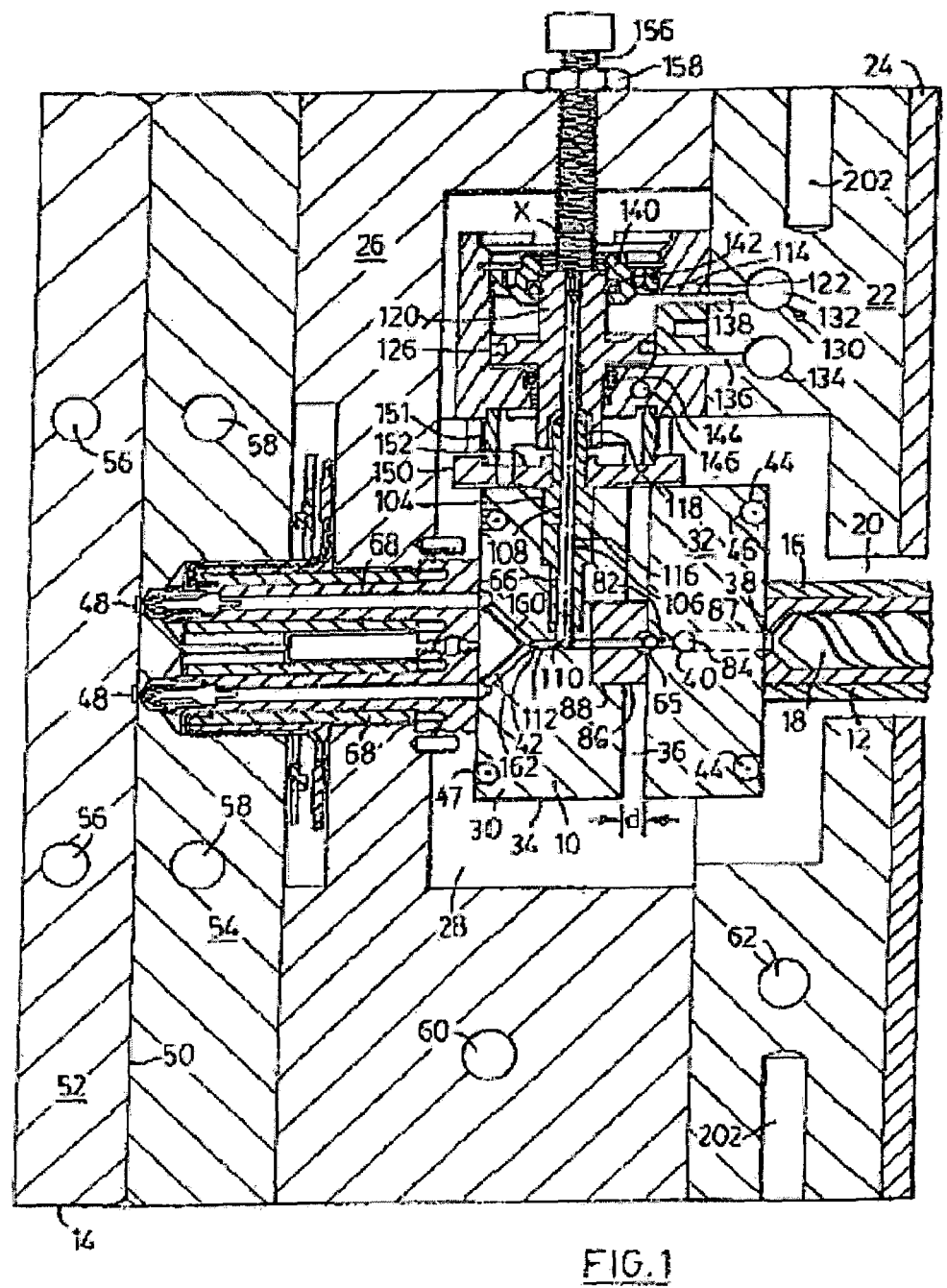
FIG. 1 is a cross-sectional elevation of a hot runner system constructed in accordance with the invention, this cross-section being taken along the longitudinal axes of the metering ram and the feed conduit into which the elongate chamber for the metering ram opens, this view also showing a portion of a screw-type plasticizer unit and two plastic injection nozzles.

A hot runner system 10 constructed in accordance with the invention is illustrated in cross-section in FIG. 1 and this system is capable of injecting melted plastics material from a plasticizer unit 12 into an injection mold 14. This hot runner system is particularly useful for molding very small plastic devices and parts, hereinafter referred to as "micro parts". It will be understood that the plasticizer unit 12 can be of standard construction but is preferably small for such units. The unit 12 can include a barrel 16 and a screw 18 capable of plasticizing the plastic material in a well known manner. The screw is rotated by a motor (not shown) and the barrel is typically heated to the required temperature for the particular plastics material being used by heaters such as electrical heaters. It will be understood that plastic pellets can be fed into the barrel chamber from a feed hopper (not shown). The barrel extends through a suitable opening 20 formed in a clamping plate 22. As shown, the clamping plate is covered on its exterior surface by an insulating plate 24 which can, for example, be made of glass fiber reinforced plastic. Mounted next to the plate 22 is a manifold mold plate 26 in which is formed a manifold cavity 28. Located in this cavity which is generally rectangular in vertical cross-section is a hot runner manifold indicated generally at 30. Although it is possible to construct the manifold 30 as a single plate unit, the illustrated preferred manifold is a two-part manifold apparatus including first manifold section 32 and second manifold section 34 located close to each other but spaced apart a short distance d by an insulating arrangement, preferably an insulating air gap 36. The first manifold section, which can also be described as the main distribution manifold, includes an inlet 38 for receiving melted plastics material from the plasticizer unit 12. The inlet is preferably located on a vertical, outer side of the manifold section 32. A first conduit system indicated generally at 40 is formed in the first manifold section for conducting the melted plastics material to the second manifold section 34 and the first conduit system is connected to the inlet 38. A second feed conduit system indicated generally at 42 is formed in the second manifold section for conducting the melted plastics material through this section and the second feed conduit system is operatively connected to the first conduit system, this connection being either at one location or a plurality of locations as explained further hereinafter.

At least one primary heater 44 for heating the first manifold section 32 to a first elevated temperature range suitable for conducting the melted plastics material without significant thermal degradation is provided. In the embodiment of FIG. 1, the primary heater comprises an electrical tubular heater that extends around the vertical, outer surface of the manifold section 32. The illustrated electrical heater is mounted in an elongate groove 46 formed in the surface of the manifold section. The use of such tubular electric heaters is well known in the hot runner system art and accordingly a detailed description herein is deemed unnecessary. There is also at least one secondary heater 47 for heating the second manifold section to a second temperature range which is hotter than the first temperature range and which heats the melted plastics material to the second temperature range which is suitable for injecting the melted plastics material into at least one mold cavity. In FIG. 1, there are two mold cavities 48 which are arranged along a mold parting line 50. The mold cavities can in fact be micro cavities, that is very small cavities designed to mold micro parts. Meeting at the parting line 50 are a movable core plate 52 and a cavity plate 54 for cavity inserts. Coolant passageways can be formed at 56 and 58 in the core plate and cavity plate respectively. These plates are typically maintained at a temperature in the range of 200 to 400 degrees C. and it will be understood that the actual temperature selected in this range will depend upon the particular type of plastic being molded. Representative coolant passages 60 and 62 are also shown in the manifold mold plate 26 and in the clamp plate 22 and it will be understood that a suitable coolant is circulated through these passageways to maintain these plates at the precise, desired temperature for operation of the mold apparatus and the hot runner system. Although not shown in FIG. 1, the mold cavities 48 are typically formed in mold inserts that can be readily and securely mounted in the core plate so that the mold apparatus can be used to make a wide variety of small parts, if desired.

The hot runner manifold 30 includes a check valve 65 mounted in the manifold and allowing one way flow of the plastics material in the overall feed conduit system that extends through the manifold. The one way flow is in a direction of flow away from the inlet 38. This check-valve is located upstream from a metering apparatus 66 described in detail hereinafter. This metering apparatus is adapted to provide a precise quantity of the melted plastics material for at least one injection apparatus 68. Illustrated in FIG. 1 are two injection apparatus or nozzles identified by 68 and 68', these being mounted one above the other and extending from an outer vertical side of the second manifold section 34 to the mold parting line 50. Each of the injection apparatus 68, 68' is operatively connected to a downstream end of the feed conduit system 42.

Figure 3:
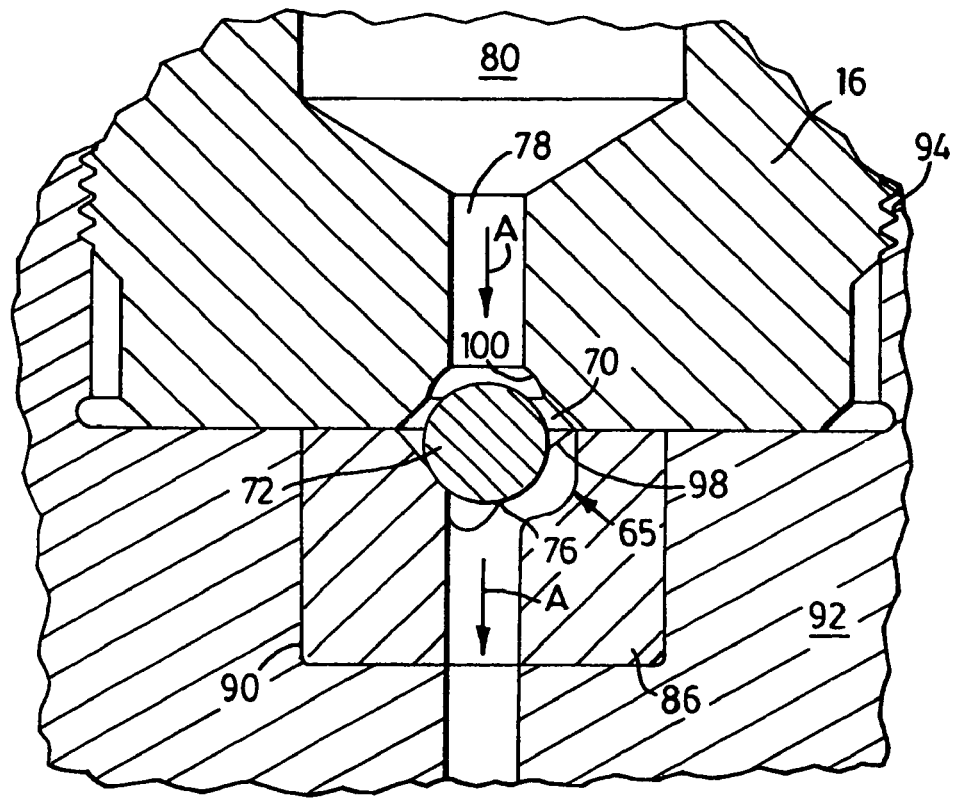
FIG. 3 is a detailed cross-sectional view illustrating a preferred form of check valve in the open position.
Figure 4:
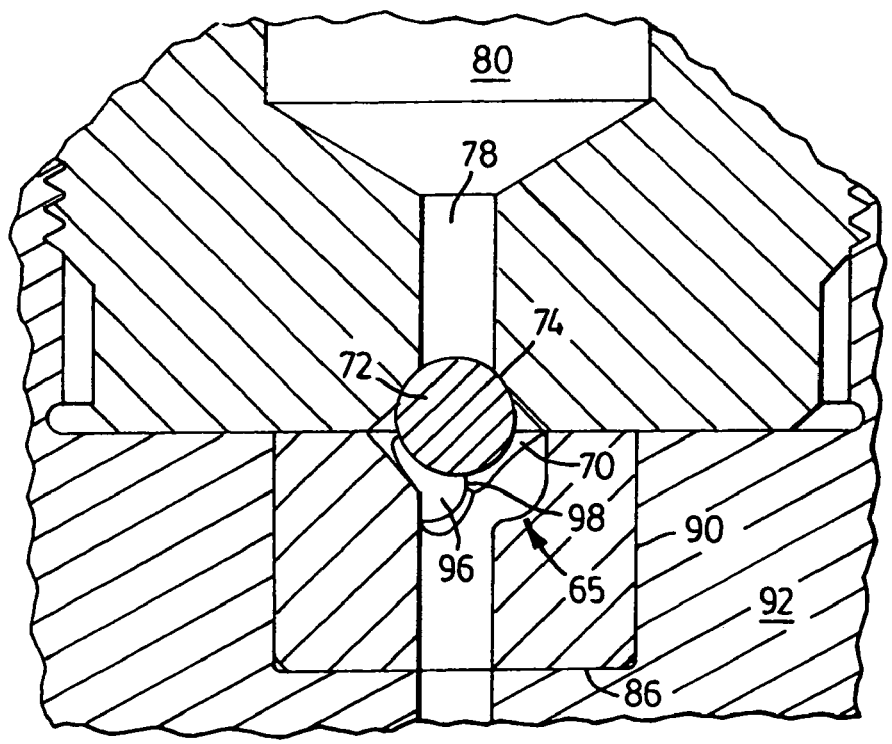
FIG. 4 is a cross-sectional detail similar to FIG. 3 but showing the check valve in the closed position.

The preferred check valve 65 will now be described in detail with particular reference to FIGS. 3 and 4. The check valve 65 includes a valve chamber 70 and a ball 72 movable within the chamber 70 between the valve closing position (shown in FIG. 4) at an upstream side 74 of the valve chamber and a valve open position, shown in FIG. 3, at a downstream side 76. The direction of flow of the hot, melted plastics material through the check valve is indicated by the arrows A in FIG. 3. The ball 72 preferably is a hardened steel ballbearing and, as illustrated in FIGS. 3 and 4, the ball and the chamber can be located at the end of a short, relatively narrow, melt bore or conduit 78. In the simplified version of FIGS. 3 and 4, the conduit 78 is shown as extending directly from a plasticizing chamber 80 of an extruder barrel 16, only a portion of which is shown. Thus, in this simplified version, there is only one plasticizing unit 12 for each check valve and for each metering apparatus 66. However, in the preferred version illustrated in FIG. 1, there is a short, narrow branch bore 82 that extends horizontally from a main feed bore 84, these bores forming part of the aforementioned first conduit system 40. A relatively large, connecting bore 87 extends between the inlet 38 of the manifold and the main feed bore 84.

The preferred check valve 65 includes a valve body 86 which is a valve member separate from the manifold or the preferred manifold sections 32, 34. This preferred valve body can be made from powder metallurgical steel which is very hard and corrosion resistant. As illustrated in FIGS. 1, 3 and 4, the valve chamber 70 is at least partially formed in the valve body 86, the remainder of the valve chamber being formed either in the inner surface of the first manifold section 32 (as shown in FIG. 1) or in the end of the barrel of the plastic extruder (as shown in FIGS. 3 and 4).

In the version of FIG. 1, the valve body 86 (in which either one or a plurality of valve chambers can be formed) is mounted in a rectangular recess 88 formed on the inner side of the second manifold section 34. The portion of the valve body not located in this recess extends across the air gap 36 so that the valve body acts as a form of spacer between the two manifold sections. The two manifold sections can be held together in the position shown in FIG. 1 by a plurality of hex screws (not shown). For example, there can be four connecting hex screws with one located at each of the upper and lower corners of the manifold sections. In the version of FIGS. 3 and 4, the valve body 86 is located in rectangular recess 90 formed in manifold member 92. Also illustrated in FIGS. 3 and 4 is an external thread 94 formed on the barrel 16 which is used to connect the barrel to the side of the manifold 92.

A plurality of grooves 96 are formed in the valve body 86 on the downstream side of the chamber 70. These grooves permit the flow of the melted plastics material around and past the ball 72. Ridges 98 separate and define the grooves on the downstream side. On the upstream side there is an annular concave surface 100 and the curvature of this surface matches closely the curvature of the ball 72. It will be appreciated that any backflow of the melted plastics material in the conduit causes the ball 72 to quickly move to the position shown in FIG. 4. In this position the ball effectively seals the conduit and prevents any further backflow of the plastics material into either the passageway 78 of the extruder or the bore 82 in the first manifold section. This prevention of backflow also permits the required build up of pressure in the second feed conduit system 42, this build up occurring when the metering apparatus 66 is operated. The movement of the ball 72 to the closed position can be achieved by normal screw return movement of the screw in plasticizer unit 12. The preferred illustrated check valve is also able to operate at relatively high temperatures, for example, in the order of 400 degrees C. or more.

Preferably the ball check valve 65 is flow streamlined to prevent melt hangup dead spots which may occur if other types of check valves are used. As is well known in the molding art, such deadspots must be avoided, if possible, because the plastic melt in such spots can degrade. Instead of the ball 72, the check valve can have an elongate bullet shaped floating valve member that operates in a manner similar to the illustrated ball 72 and that is movable within the chamber by the melted plastics material. The preferred check valve movement is relatively short for a quick shuttle time. The upstream shut off or closed position shown in FIG. 4 is preferably taken right after the fill and pack time of the injection cycle while the plastic part is still cooling within the mold cavity. Other possible shut off devices or check valves for the prevention of a melt back flow into the common feed channel or feed bore 84 (or into the passage 78 of the plasticizer unit) include a mechanical shut off slide or pin that locks off the bore to the main feed channel by means of external actuation with an axial or rotational movement. Such valves, however, have the disadvantage of adding complexity, more controls and higher costs for the hot runner system.

Turning now to the construction of the preferred metering apparatus 66, it will be understood firstly that this apparatus is adapted to provide a precise quantity of the melted plastics material to at least one injection apparatus 68, 68'. The illustrated, preferred metering apparatus includes a cylinder unit indicated generally at 104 forming an elongate metering chamber 106 and a ram 108 movable in the metering chamber. The metering chamber has a longitudinal axis indicated at X in FIG. 1. This chamber also has an inner end 110 which is open at one side of an elongate portion 112 of the second feed conduit system 42 and which is downstream of the check valve 65. It will be seen that the longitudinal axis X is substantially perpendicular to a central longitudinal axis of the elongate portion 112 of the feed conduit.

The metering apparatus also includes a controller indicated generally at 114 for a controlling movement of the ram 108 in the metering chamber. It will be understood that the controller includes a computer or microprocessor control system which can be of standard design per se.

In a preferred embodiment of this hot runner system, the relatively long and thin ram 108 is made of high chromium powder metallurgical steel that has been flue hardened. A particularly preferred steel has 15 to 20% chromium and has a hardness of 60 $HR_c$. The preferred metering chamber is formed by two similar sleeve members 116, 118 each of which has a narrow portion and a wide portion with the two wide portions being positioned adjacent one another. Each of these sleeves is made to very close tolerances both externally and internally so that it can fit snugly within the second manifold section 34 and so that there is no gap between the exterior of the ram and the longitudinal passageway formed in each sleeve member. The high tolerance measurements of these sleeve members must be within a few microns of the specified dimensions.

Figure 6:
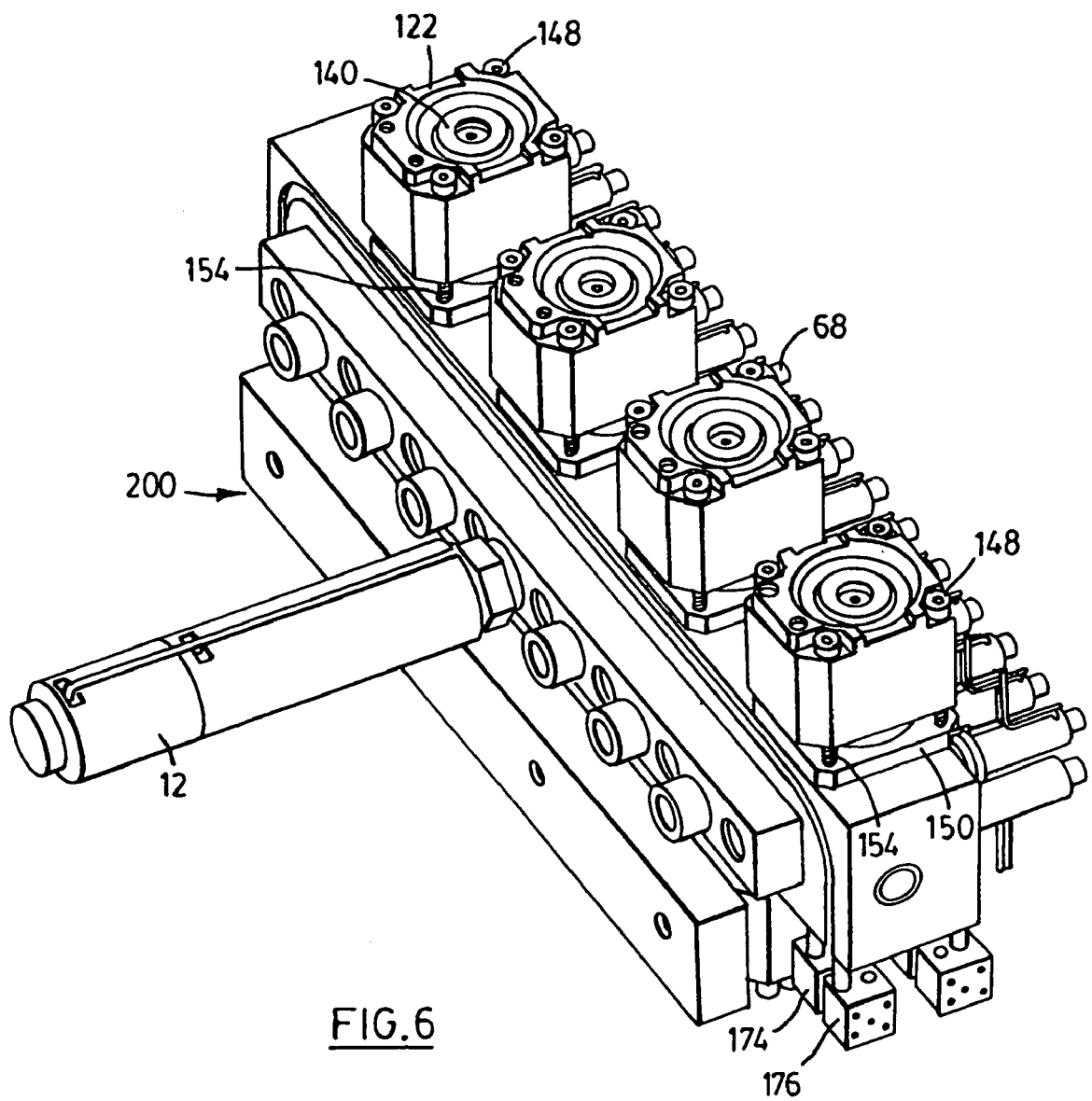
FIG. 6 is an isometric view of another embodiment of the hot runner system, this view showing four metering apparatus mounted along a top side of the system and a screw-type plasticizer unit projecting from the left side.

The preferred illustrated metering apparatus 66 includes a piston member 120 which is rigidly connected to an outer end of the ram 108 and is substantially wider than the ram. The metering apparatus further includes a piston housing 122 that can have a rectangular exterior as shown in FIG. 6. The piston member is slidably movable in the piston chamber in a sealing manner. In one preferred embodiment, a Flour elastomer 126 in the form of a high temperature O-ring extends about the circumference of the piston and forms the required seal between the piston and the piston chamber. A pressurizing system indicated generally at 130 provides pressurized fluid to the piston chamber in order to drive both the piston member and the ram 108 inwardly until an inner end of the ram reaches the inner end 110 of the metering chamber, thereby providing the selected quantity of melted plastics material to the injection apparatus 68, 68'. The pressurizing fluid can either be air or oil that is delivered or removed through passageways 132, 134 and connecting bores 136, 138. Air is the preferred pressurizing fluid for plastic micro parts that require clean operating conditions and a typical operating pressure for the air is 7 bars.

The piston housing 122 is closed at its outer end by a circular end plate 140, the outer side of which can be seen in FIG. 6. The end plate is formed with a circular bore that receives a cylindrical end section of the piston member 120 and arranged between this end section and the plate is an annular air seal 142. A further air seal 144 extends about a cylindrical front section of the piston member and is mounted in an annular groove formed in the piston housing 122. It will be understood that the piston housing 122 is cooled to a suitable temperature for piston operation by means of water or a suitable known coolant and a representative bore 146 for the coolant is illustrated. The piston housing is held in place as shown by four screws 148 which are visible in FIGS. 5 and 6. These screws connect the housing to a mounting plate 150, four of which can be seen in both FIGS. 5 and 6 wherein there are four piston housings visible. Clamped between the piston housing 122 and the mounting plate is a spacer ring 151, the outer end of which fits within an annular groove formed in the inner end of the housing. The inner end of the spacer ring fits into an annular recess 152 formed in the mounting plate. The spacer ring 151 provides a thermal insulation gap between the piston housing 122 and the side of the manifold in order to reduce heat conduction from the heated manifold into the piston housing. Each mounting plate 150 is mounted to the manifold by means of four screws 154 which can be seen in FIGS. 5 and 6.

Threaded into the manifold mold plate 26 is a threaded adjusting bolt 156 having a central longitudinal axis aligned with the longitudinal axis of the metering chamber 106, that is the axis indicated at X. Thus, the bolt 156 is supported by the plate 26 in such a manner that the bolt extends outwardly from an outer end of the piston member 120 when the latter is fully retracted. An outermost limit to outward movement of the piston member and the ram 108 can be set by turning the bolt 156 inwardly or outwardly about its central longitudinal axis. This adjustment can be done manually and relatively easily and the bolt can be secured in the required position by adjustment nut 158. It will be seen that the inner end of the bolt engages the outer end of the piston member when the latter is at the outer end of its stroke.

Shown in FIG. 1 is a pair of injection apparatus 68, 68' arranged beside each other and these are mounted by screws or other suitable means to the manifold mold plate 26. It will be understood that there can in fact be a series of these pairs of injection apparatus as illustrated in the embodiment of FIG. 6 where there are in fact sixteen pairs of injection apparatus distributed evenly along the length of the manifold. In order to deliver the hot melted plastics material to the two injection apparatus 68, 68', the elongate portion 112 of the feed conduit splits into two branch bores 160, 162 downstream of the inner end of the metering chamber and these bores extend respectively to the two injection apparatus 68, 68'. Thus, during use of this hot runner system, the metering apparatus 66 is able to provide one half of the selected quantity of the melted plastics material to each injection apparatus 68, 68'. The illustrated injection apparatus 68, 68' are thermal hot tip gates which are more typical and more practical for micro molded parts. However it is also possible to use known forms of mechanical "valve gates" for the injection apparatus. These valve gates each have a valve stem that is movable between open and closed positions for gate orifice control and these gates are more complex.

Figure 2:
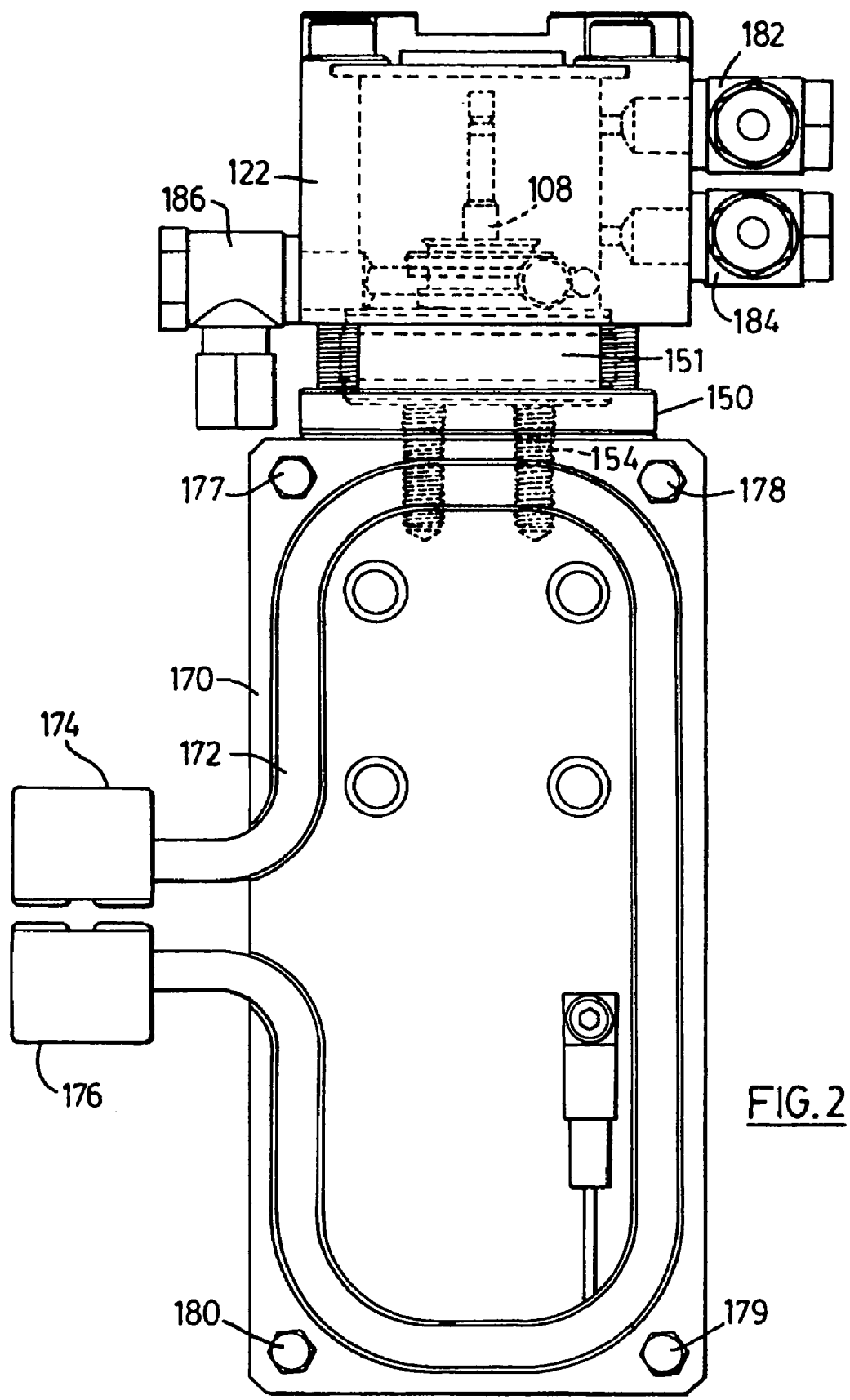
FIG. 2 is a side elevation of a hot runner system constructed in accordance with the invention, this view showing an electrical heater for the manifold and pressurized air connectors and a coolant connector.

Turning now to the embodiment of a hot runner system constructed in accordance with the invention shown in FIG. 2, this embodiment has a manifold indicated generally at 170 and extending about the perimeter of this manifold on one side is a tubular electric heater 172 similar to the primary heater 44 and secondary heater 46 shown in FIG. 1. Two electrical connectors 174, 176 are located at opposite ends of the heater, these connectors being of standard construction. The manifold is mounted in position by means of four screws or bolts located at 177 to 180, that is, at the four corners of the manifold.

Also shown in FIG. 2 are two air hose connectors 182, 184 which are mounted on the side of the piston housing 122. These provide the pressurized air to operate the piston and they are operatively connected to the inside of the piston chamber. Also shown in FIG. 2 is a standard coolant connector 186 that is connected to the opposite side of the housing 122. A coolant source is connected to the connector 186 which in turn is operatively connected to the cooling bores formed in the housing.

Figure 5:
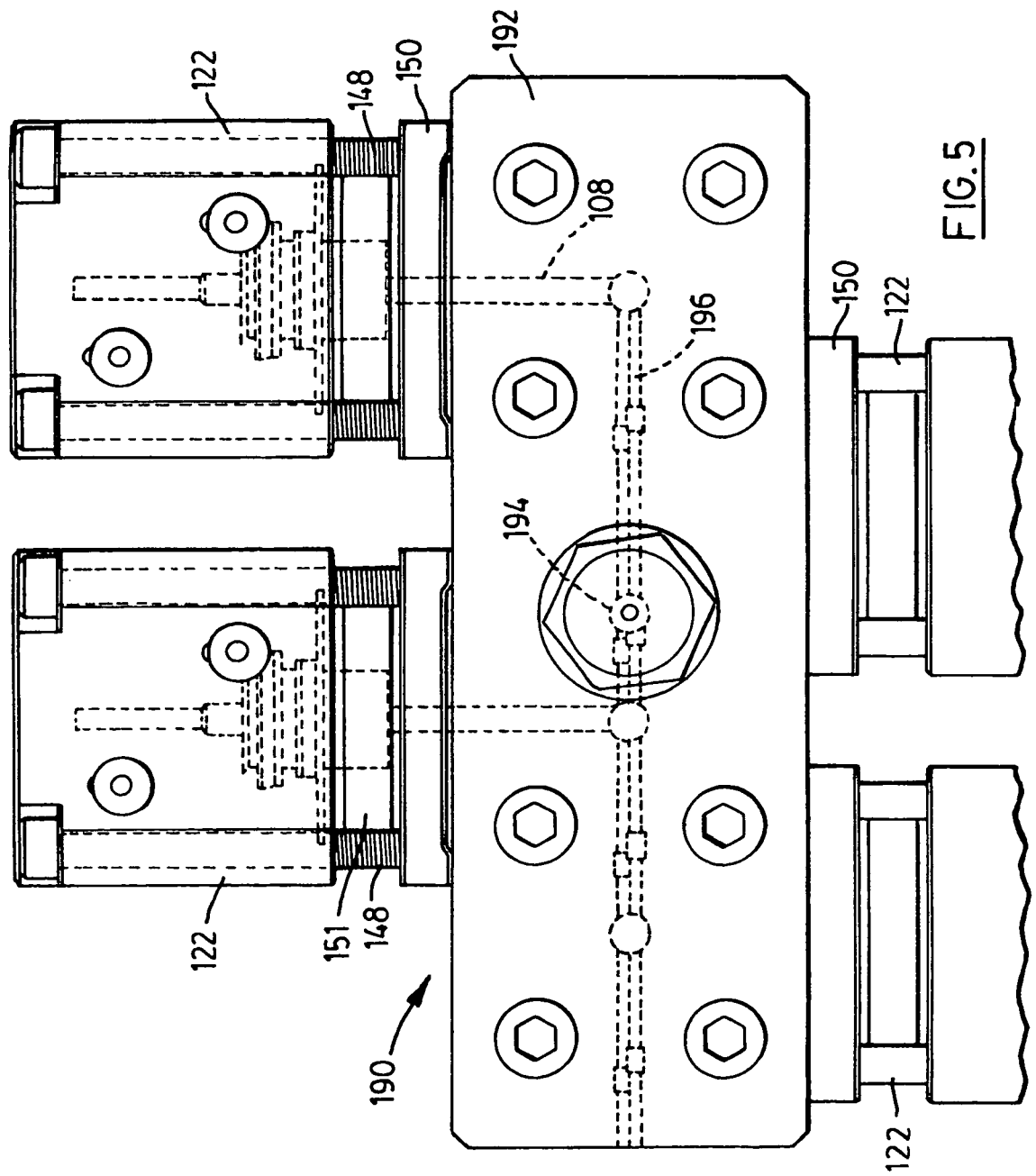
FIG. 5 is a rear view of another embodiment of a hot runner system constructed in accordance with the invention, with portions of the system omitted for ease of illustration.

Turning now to the embodiment of a hot runner system which is shown in FIG. 5, this hot runner system which is indicated generally at 190 includes a manifold 192 to which are connected four of the above described piston housings 122, each containing a piston to operate a ram 108. It will be noted in particular that in this embodiment there are two of the housings 122 mounted on top of the manifold and two of the housings 122 mounted on the bottom of the manifold. The two upper piston housings are staggered in their position relative to the two lower piston housings, In this way, the rams that they operate are evenly and relatively closely spaced in the longitudinal direction of the manifold 192. Located at the centre of the manifold is the connecting point 194 for the plasticizer unit. Thus, in the system 190 there is a single plasticizer unit that feeds hot plastic melt through a main feed bore 196 to four branch bores that deliver melted plastic to the injector apparatus. The illustrated hot runner system of FIG. 5 is constructed to feed melt to sixteen nozzles or injection apparatus with each metering unit supplying a cluster of four nozzles.

Turning to FIG. 6, which illustrates a larger, commercial version of the hot runner system of the invention, this hot runner system indicated generally at 200 has a single plasticizer unit 12 mounted on the left side as shown and it has sixteen pairs of injector apparatuses mounted on the right side of the manifold. In this embodiment, there are four piston housings 122 mounted along the top side of the manifold and it will be understood that there are also four piston housings containing pistons mounted along the bottom side of the manifold but not visible. Again, the four piston housings on top are staggered relative to the piston housings on the bottom. Each of these piston housings and the pistons therein operate a metering apparatus 66 and it will thus be seen that in this embodiment each of the eight metering apparatus delivers a precise amount of melted plastics material to four of the injection apparatus 68. Thus, in this embodiment, the feed conduit that extends past each metering apparatus splits into four branch bores downstream of the inner end of the metering chamber with each of these branch bores extending to a respective one of the injection apparatuses. Each metering apparatus in the embodiment of FIG. 6 is able to provide one quarter of the selected quantity of the melted plastics material to each injection apparatus.

Returning to FIG. 1, there is shown in the top clamp plate two bolt holes 202. Bolts (not shown) threaded into these holes can be used to lift the top clamp plate when required.

As is known in the art, the manifold (or the manifold sections in the case of the preferred embodiment of this invention) are made from high quality tool steel which preferably has a high chromium content and resists corrosion. It will be understood that the manifold used in the hot runner system of this invention and, in particular, the second manifold section 34 of the preferred embodiment, must be able to withstand very high pressures, typically pressures in the order of 10,000 to 20,000 psi. Accordingly, the manifold, or in the case of the preferred embodiment the two manifold sections, must be constructed so that it or they are able to withstand and contain these high pressures at which the manifold or manifold sections will operate. However if in fact the preferred two manifold sections are used, the first manifold section can be constructed to operate at a lower pressure, for example a pressure in the order of 1500 psi. The second manifold section should be constructed then to operate at much higher pressures, for example a pressure of about 15,000 psi or more.

The very small plastic parts made with the hot runner system of the present invention can have a weight of less than 1.0 gram but more than 0.001 gram (1 mg). The bore diameter size to make such small parts is dependent to some extent on the plastics material that is being used to make the part or component. For example, high viscosity materials such as PC, PSU or PEI require larger melt bore diameters than low viscosity materials such as PS. However, it will be appreciated that there is a limit to the size of the melt bore because polymers are organic materials and the plastic melt is subject to thermal degradation over time. The feed conduit system that is used in the manifold or manifolds section of the invention can have a diameter which varies between various locations in the conduit system and the diameter of each section in the conduit system is dependent to some extent on the polymer or polymers that will be used in the hot runner system. Generally speaking, the feed conduit system has a diameter or diameters in the range of 1 to 5 mm. Similarly, the ram and the metering chamber which are used to meter a precise dose of the plastic melt can have a diameter which varies but, in a preferred embodiment, this diameter is in the range of 2 to 4 mm, with one particular embodiment having a ram diameter of about 3 mm.

Hot runner systems in the past that have been used in conjunction with multiple cavity molds have relied upon a balance in the flow channels based on the principle of an even flow length of the melt channels leading from the machine nozzle to the mold cavities. In order to employ this type of hot runner system in a mold having a high number of mold cavities, for example, thirty-two or forty-eight, the melt channels in the manifold generally contain a significant melt volume which becomes a serious problem in the molding of micro parts. In the preferred hot runner system described herein, there is no need for a naturally balanced distribution manifold of the type used in prior art hot runner systems. Instead of multiple branch melt bores as in previous systems, the present system can employ one main feeding channel to deliver melt to a relatively large number of mold cavities. As a result, in the present hot runner system as described above, the melt volume in the preferred manifold is reduced with the resulting improvement in the melt residence time that is critical for micro molded parts because the metering system is close to the micro cavity.

Figure 7:
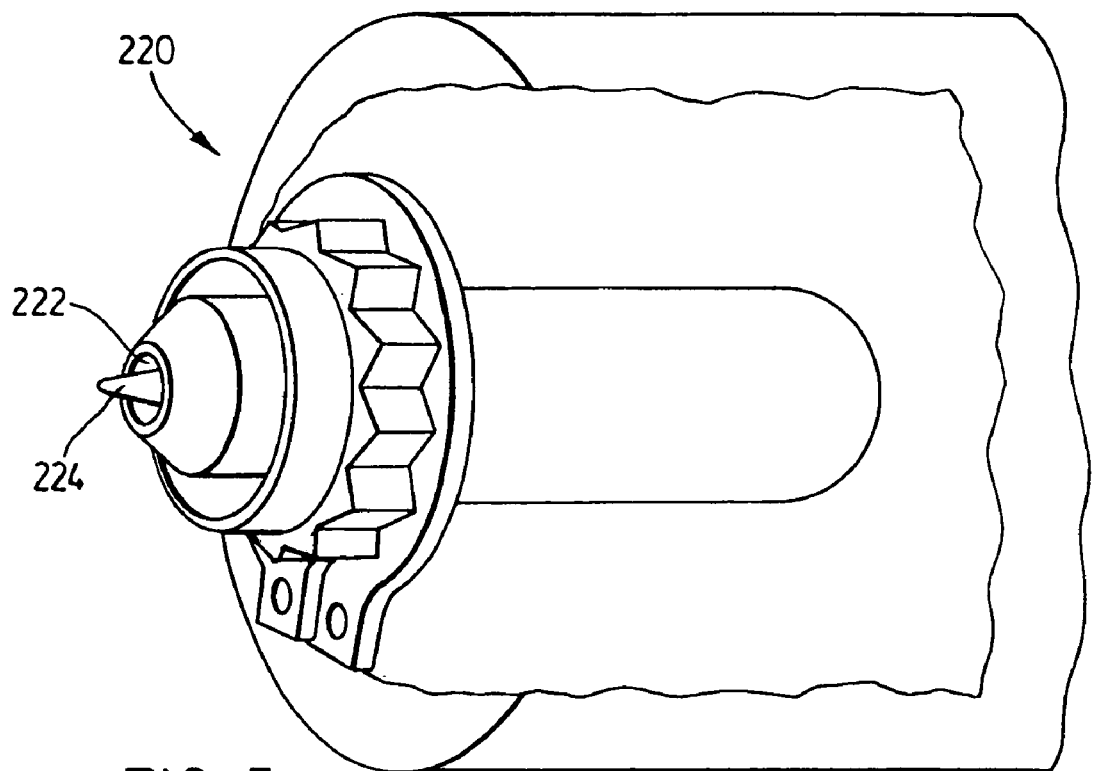
FIG. 7 is an isometric detail view showing the front end and a side of a thermal hot tip gate that can be used in the hot runner system.
Figure 8:
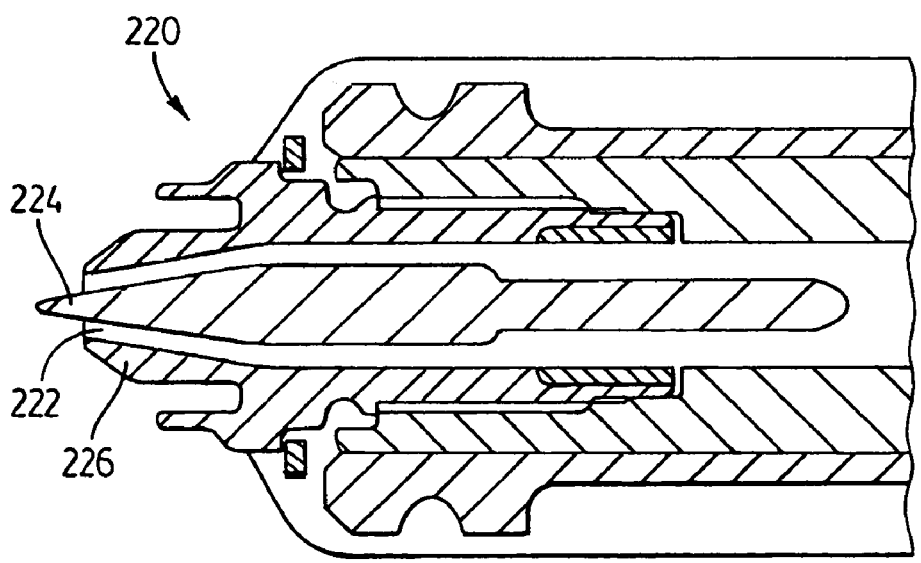
FIG. 8 is an axial cross-section of the thermal hot tip gate of FIG. 7.

FIGS. 7 and 8 illustrate a standard form of thermal hot tip gate that can be used for the injection apparatus or nozzle of the present hot runner system. This particular thermal hot tip gate is indicated generally by reference 220. It will be appreciated that this type of thermal hot tip gate is well known in the plastic molding industry and accordingly a detailed description herein is deemed unnecessary. The gate orifice 222 which is located at the micro cavity in the injection mold has a very small diameter, for example in the range of 0.4 to 0.6 mm. The relatively small melt volume for the micro part enters through this gate orifice at a melt pressure of 10,000 to 20,000 psi at a precise, predetermined melt processing temperature within a range of plus or minus 5 degrees C. It will be appreciated that micro parts often do not allow a large part surface to gate on and the gate needs to break or fracture clean at the part surface with little vestige. The thermal hot tip gate 220 functions on a cyclodynamic thermal freeze off cycle and it will be understood that a cold slug forms inside the gate orifice 222 during the cooling time for the micro part.

The gate 220 has an inner stationary torpedo tip that extends into the gate orifice 222 and that is concentric therewith. This torpedo tip conducts heat from the nozzle body heater through a front insert into the gate. The torpedo tip, which is thermally conductive, controls the formation of the cold slug after the melt has been injected into the micro cavity. A preferred form of torpedo tip is made from molybdenum alloy which can withstand temperatures of up to 600 degrees C. in excess of any plastic processing temperature. When the actual micro plastic part has solidified inside the mold cavity as a result of the mold cooling phase, the mold opens and pulls the "cold" plastic part away from the gate orifice. The tapered shape of the gate orifice formed by the frustro conical surface 226 causes the cold slug to fracture and to remain inside the gate during this step. This cold slug now prevents the plastic melt from drooling out through the gate and also prevents the melt from being pulled into strings.

With the next injection cycle, the small cold slug is injected into the mold cavity where it is dissolved by the initial melt pressure impulse from the ram. The temperature of the inner heat conductive torpedo and the cooling temperature of the gate metal (steel) follow a thermodynamic cycle in order to achieve the required gate fracture. It will be understood that precise temperature control on both sides of the required temperature is required and this is achieved by both gate cooling and tip heating and by micro processor precision temperature controllers with a closed loop feedback of the temperature readings via thermocouples that are placed in the nozzle tip area. In this regard it should be noted that the nozzle front insert is thermally insulated from the larger gate area by a pocket that fills with a plastic melt layer.

As will be appreciated, with the use of first and second manifold sections 32 and 34, the first manifold section can advantageously operate at a lower temperature than the second manifold section with the actual temperatures that are used depending in part on the plastic that is being molded. The following are three examples of temperatures that can be used in these manifold sections for three common plastics:

| PC (Polycarbonate) | manifold 32 set temperature | 260 degrees C. |
| --- | --- | --- |
|  | manifold 34 | 290 degrees C. |
| PSU (Polysulfon) | manifold 32 set temperature | 340 degrees C. |
|  | manifold 34 | 380 degrees C. |
| PET (Polyethylenterephthalat) | manifold 32 set temperature | 250 degrees C. |
|  | manifold 34 | 285 degrees C. |

In the preferred hot runner system of the invention, the forward stroke of the piston and the ram driven thereby generates the melt pressure that is needed to fill the exact amount of melt into the micro cavity. While the plastic melt inside each filled mold cavity is cooling, the piston forward pressure continues to pack melt into the plastic part in compensation for the volumetric shrinkage of the part during the cooling phase. This allows control of the weight and dimensions of the micro parts accurately in each cavity. Furthermore, in a preferred embodiment, it is possible to inject and pack not only a plurality of micro cavities of the same size and shape but to combine different micro parts into one mold. Such a so called micro family mold can produce different parts within the volumetric metering range of the metering ram. As indicated, it is possible to vary the stroke of the piston and the attached ram 108 and it is also possible to change the diameter of the ram. Thus, the injection molding system of the invention is quite flexible and can be used to produce different parts of the same or different size, shape and wall thickness. In order to accomplish this, the mold cavity inserts can be changed and, if necessary, the metering ram.

As an alternative to the described control system for operating and controlling the ram 108, it is possible to use a servo valve that is not only able to control the back and forward stroke of the ram but also its speed. With a system of this type, each metering ram can apply an injection pressure profile to meet specific mold cavity fill and pack requirements. Instead of using oil or air to drive and control the piston member 120, it is also possible to drive the piston by an electrical mechanical drive or an electro magnetic drive.

Another alternative of the described hot runner system involves the integration of the plastification unit with the hot runner system. This variation can help reduce the melt residence time and shorten the thermal exposure of the plastic material.

It will be appreciated by those skilled in the construction of hot runner systems for plastic injection molding, particularly systems capable of making very small plastic parts and devices, that various modifications and changes can be made to the described and illustrated hot runner systems without departing from the spirit and scope of this invention. Accordingly, all such modifications and changes as fall within the scope of the appended claims are intended to be part of this invention.

I claim:

1. A hot runner system for injecting plastics material from a plasticizer unit into an injection mold for molding very small plastic devices and parts, said system comprising:

a hot runner manifold having an inlet for receiving melted plastics material from said plasticizer unit, at least one heating arrangement for maintaining the manifold at a selected elevated temperature suitable for flow of said melted plastics material through said manifold without undesirable degradation, an elongate plastics feed conduit connected to said inlet, a check valve mounted in said manifold and allowing one-way flow of said plastics material in said feed conduit in a direction of flow away from said inlet, said check valve including a valve chamber and a valve member movable within said chamber between a valve closing position at an upstream side of the valve chamber and a valve open position at a downstream side of said chamber, said valve member being moved to the valve closing position or the valve open position by flow of said plastics material in said valve chamber;

at least one injection apparatus operatively connected to a downstream end of said feed conduit, the or each injection apparatus having a central longitudinal injection axis;

a metering apparatus adapted to provide a precise quantity of said melted plastics material to said at least one injection apparatus, said metering apparatus including a cylinder unit forming an elongate metering chamber and a ram movable in said metering chamber, said metering chamber having a longitudinal axis and an inner end which is open at one side of an elongate portion of said feed conduit and which is downstream of said check valve, said longitudinal axis being substantially perpendicular to a central longitudinal axis of said elongate portion, and a controller for controlling movement of said ram in said metering chamber, said at least one injection apparatus being spaced a substantial distance from said metering apparatus including said inner end of the metering chamber, wherein said metering apparatus is able to provide a selected quantity of said melted plastics material to said at least one injection apparatus via a downstream section of said feed conduit while said check valve prevents melted plastics material in said feed conduit from backflowing to said plasticizer unit, said at least one injection apparatus is adapted to inject said selected quantity of said melted plastics material into at least one molding cavity of said injection mold, and the central longitudinal injection axis of said at least one injection apparatus is at a substantial angle to said longitudinal axis of the elongate chamber.

2. A hot runner system according to claim 1 wherein said valve member is a ball movable within said chamber.

3. A hot runner system according to claim 2 wherein said check valve includes a valve body separate from said manifold and in which said valve chamber is at least partially formed, and grooves are formed in said valve body in said downstream side of said chamber, said grooves permitting flow of said melted plastics material around and past said ball.

4. A hot runner system according to claim 1 wherein said metering apparatus includes a piston member rigidly connected to an outer end of the ram and substantially wider than said ram, a piston housing forming a piston chamber in which said piston member is slidingly movable, and a pressurizing system for providing pressurized fluid to said piston chamber in order to drive both said piston member and said ram inwardly until an inner end of said ram reaches said inner end of said metering chamber and thereby provide said selected quantity of melted plastics material.

5. A hot runner system according to claim 4 including a threaded adjusting bolt having a central longitudinal axis aligned with said longitudinal axis of said metering chamber and plate means for supporting said adjusting bolt so that the latter extends outwardly from an outer end of said piston member, wherein an outermost limit to outward movement of said piston member and ram can be set by turning said bolt inwardly or outwardly about its central longitudinal axis.

6. A hot runner system according to claim 1 wherein said hot runner manifold includes first and second manifold sections which are separated by an insulating gap, said first manifold section being maintained at a substantially lower temperature range than said second manifold section during operation of said hot runner system whereby said melted plastics material can reside in a substantial portion of said feed conduit which is within said first manifold section for an extended length of time without significant degradation.

7. A hot runner system according to claim 6 wherein said check valve is mounted between said first and second manifold sections and at least an inner section of said metering chamber is located within said second manifold section.

8. A hot runner system according to claim 1 wherein said plastics feed conduit has a diameter that can vary and is in the range of 1 to 5 mm.

9. A hot runner system according to claim 8 wherein there are two of said at least one injection apparatus and said elongate portion of said feed conduit splits into two branch bores downstream of said inner end of the metering chamber, said two branch bores extending respectively to the two injection apparatuses, whereby during use of the hot runner system, said metering apparatus is able to provide one half of said selected quantity of the melted plastics material to each injection apparatus.

10. A hot runner system according to claim 8 wherein said ram and said metering chamber each have a diameter in the range of 2 to 4 mm and the central longitudinal axis of said at least one injection apparatus is substantially perpendicular to said longitudinal axis of the elongate chamber.

11. A hot runner system for injecting hot, melted plastics material from a plasticizer unit into at least one small mold cavity, said system comprising:
a hot runner manifold having an inlet for receiving said melted plastics material from said plasticizer unit, a heating arrangement for maintaining said manifold in one or more desired temperature ranges suitable for conducting said melted plastics material through said manifold, and at least one elongate plastics feed conduit formed in said manifold and connected to said inlet;
a check valve mounted in said manifold and constructed to allow only one way flow of said plastics material in said at least one feed conduit in a direction of flow away from said inlet, said check valve including a valve chamber and a valve member movable within said chamber by the melted plastics material between a valve closing position at an upstream side of said chamber and a valve open position at a downstream side of said chamber;
at least one plastics injection apparatus operatively connected to an outlet end of said at least one feed conduit and adapted to inject a selected quantity of said melted plastics material into said at least one small mold cavity;
a metering apparatus capable of providing a selected small quantity of said melted plastics material to said at least one injection apparatus while said at least one injection apparatus is carrying out its plastic injection operation, said metering apparatus including an elongate metering chamber and a ram movable in said metering chamber, said metering chamber having an open inner end located on one side of one of said at least one feed conduit downstream of said check valve and upstream of said outlet end of said at least one feed conduit,
wherein said metering apparatus is able to provide said selected small quantity of said melted plastics material to said at least one injection apparatus via a downstream section of said at least one feed conduit while said check valve prevents said melted plastics material from backflowing to said plasticizing unit.

12. A hot runner system according to claim 11 wherein said check valve includes a valve body, which is a body separate from but attached to said manifold and in which said valve chamber is at least partially formed, said valve member is a metal ball, and grooves are formed in said valve body at said downstream side of said chamber, said grooves permitting flow of said melted plastics material around and past said metal ball during use of said hot runner system.

13. A hot runner system according to claim 11 wherein said metering apparatus includes a piston member rigidly connected to an outer end of the ram and substantially wider than said ram, a piston housing forming a piston chamber in which said piston member is slidingly movable, and a pressurizing system for providing pressurized fluid to said piston chamber in order to drive both said piston member and said ram inwardly until an inner end of said ram reaches said inner end of said metering chamber and thereby provide said selected quantity of melted plastics material.

14. A hot runner system according to claim 13 including a threaded adjusting bolt having a central longitudinal axis aligned with said longitudinal axis of said metering chamber and plate means for supporting said adjusting bolt so that the latter extends outwardly from an outer end of said piston member, wherein an outermost limit to outward movement of said piston member and ram can be set by turning said bolt inwardly or outwardly about its central longitudinal axis.

15. A hot runner system according to claim 11 wherein said hot runner manifold includes first and second manifold sections which are separated by an insulating gap, said first manifold section being maintained at a substantially lower temperature range than said second manifold section during operation of said hot runner system whereby said melted plastics material can reside in a substantial portion of said at least one feed conduit which is within said first manifold section for an extended period of time without significant degradation.

16. A hot runner system according to claim 15 wherein said check valve is mounted between said first and second manifold sections and at least an inner section of said metering chamber is located within said second manifold section.

17. A hot runner system according to claim 11 wherein said at least one feed conduit has a diameter that varies in the range of 1 to 5 mm and said valve member is a metal ball.

18. A hot runner system according to claim 12 wherein there are two of said at least one injection apparatus and said one feed conduit splits into two branch bores downstream of said inner end of the metering chamber, said two branch bores extending respectively to the two injection apparatuses, whereby during use of the hot runner system, said metering apparatus is able to provide one half of said selected quantity of the melted plastics material to each injection apparatus.

19. A hot runner system for injecting melted plastics material from a plasticizer unit into at least one mold cavity, said system comprising:
- a two-part manifold apparatus including first and second manifold sections which are located close to each other but are spaced apart a short distance by an insulating arrangement, said first manifold section including an inlet for receiving melted plastics material from said plasticizer unit, a first feed conduit system formed in said first manifold section for conducting said melted plastics material to said second manifold section, said first feed conduit system being connected to said inlet, and a second feed conduit system formed in said second manifold section for conducting said melted plastics material, said second feed conduit system being operatively connected to said first feed conduit system;
- at least one primary heater for heating said first manifold section to a first elevated temperature range suitable for conducting said melted plastics material without significant thermal degradation;
- at least one secondary heater for heating said second manifold section to a second temperature range which is hotter than said first temperature range and which heats the melted plastics material to the second temperature range which is suitable for injecting the melted plastics material into said at least one mold cavity;
- at least one injection apparatus for respectively injecting a desired quantity of the melted plastics material into said at least one mold cavity, said at least one injection apparatus being operatively connected to said second feed conduit system;
- at least one check valve mounted in said manifold apparatus to provide one-way flow of the melted plastics material in a direction away from said inlet; and
- metering apparatus for providing said desired quantity of the melted plastics material to each of said at least one mold cavity, said metering apparatus being provided in said second manifold section so as to deliver said desired quantity of the melted plastics material to said second conduit system at at least one location downstream from said at least one check valve.

20. A hot runner system according to claim 19 wherein said insulating arrangement is an air gap formed between said first and second manifold sections and each of said at least one primary heater and said at least one secondary heater is a tubular electrical heater mounted in or to its respective manifold section.

21. A hot runner system according to claim 19 wherein each of said at least one check valve includes a valve chamber and a ball movable within said chamber between a valve closing position at an upstream side of the valve chamber and a valve open position at a downstream side of said valve chamber.

22. A hot runner system according to claim 21 wherein said at least one check valve includes at least one valve body in which said valve chamber is at least partially formed and said at least one valve body is mounted between said first and second manifold sections, and wherein grooves are formed in said at least one valve body in said downstream side of said chamber, said grooves permitting flow of said melted plastics material around and past said ball during use of the hot runner system.

23. A hot runner system according to claim 19 wherein said insulating arrangement is an air gap formed between said first and second manifold sections and said at least one check valve includes at least one valve body which is mounted between said first and second manifold sections and extends across said air gap.

24. A hot runner system according to claim 23 wherein each of said at least one check valve includes a valve chamber and a ball movable within said chamber between a valve closing position at an upstream side of the valve chamber and a valve open position at a downstream side of said valve chamber.

25. A hot runner system according to claim 24 wherein each valve chamber has an upstream section formed in a side of said first manifold section and a remaining section formed in one of said at least one valve body.

26. A hot runner system according to claim 19 wherein said first feed conduit system includes a main feed bore connected to said inlet and extending lengthwise of said first manifold section and a plurality of branch bores each extending from said main feed bore to a side of said first manifold section facing said second manifold section, and wherein said second feed conduit system comprises a plurality of separate connecting bores each operatively connected to a respective one of said branch bores.

27. A hot runner system according to claim 19 wherein said metering apparatus includes at least one metering unit comprising an elongate metering chamber having a longitudinal axis and a ram movable in said metering chamber, said metering chamber having an inner end which is open at one side of an elongate section of said second conduit system and which is downstream of a respective one of said at least one check valve.

28. A hot runner system according to claim 19 including a plurality of injection apparatuses each adapted to inject said desired quantity of the melted plastics material into a single mold cavity.

29. A hot runner system according to claim 28 capable of injecting said melted plastics material into a plurality of very small mold cavities, wherein each of said first and second feed conduit systems has a conduit diameter in the range of 1 to 5 mm.

30. A hot runner system according to claim 29 wherein said insulating arrangement is an air gap formed between said first and second manifold sections and each of said at least one primary heater and said at least one secondary heater is a tubular electrical heater mounted in its respective manifold section.

* * * * *